United States Patent [19]

French et al.

[11] Patent Number: 4,767,933

[45] Date of Patent: Aug. 30, 1988

[54] OPTICAL RIBBON EDGE SENSOR HAVING MEANS FOR ADJUSTING THE SWITCH SENSITIVITY TO THE SELECTED INK COLOR

[75] Inventors: Andrew J. French, Palm Bay; James Ford; Thomas Flenner, both of Melbourne; Thomas Kleinochnitz, Palm Bay; Robert Comstock, Sarasota, all of Fla.

[73] Assignee: Storage Technology Corporation, Louisville, Colo.

[21] Appl. No.: 76,060

[22] Filed: Jul. 21, 1987

[51] Int. Cl.[4] .............................................. G01N 21/86

[52] U.S. Cl. ..................................... 250/548; 356/400

[58] Field of Search ........................ 250/548, 557, 226; 356/400, 401, 402; 226/45

[56] References Cited

U.S. PATENT DOCUMENTS

| | | | |
|---|---|---|---|
| 4,029,419 | 6/1977 | Schumann, Jr. et al. | 250/226 |
| 4,573,059 | 2/1986 | Shinma et al. | 250/548 |
| 4,671,661 | 6/1987 | Ott | 356/402 |

*Primary Examiner*—David C. Nelms
*Assistant Examiner*—William L. Oen
*Attorney, Agent, or Firm*—Woodcock Washburn Kurtz Mackiewicz & Norris

[57] ABSTRACT

An adjustable optical ribbon edge sensor having a relatively short throat for ease of loading a towel ribbon in a high-speed line printer includes one or more pairs of photosensitive switches, coupled through a variable resistor, to a comparator facilitates accurate and repeated detection of the ribbon edge regardless of the color of the ribbon. By adjusting the variable resistor, the comparator is biased for the particular color ribbon in use.

16 Claims, 3 Drawing Sheets

OPTICAL RIBBON EDGE SENSOR HAVING MEANS FOR ADJUSTING THE SWITCH SENSITIVITY TO THE SELECTED INK COLOR

BACKGROUND OF THE INVENTION

This invention relates generally to high-speed line printers employing towel ribbons, and more particularly to an improved method and apparatus for detecting the edge of such towel ribbons.

Conventional high-speed line printers, such as the Impact 5000 Series printers manufactured by Documation Incorporated (now StorageTek Printer Corporation), a subsidiary of Storage Technology Corporation, are capable of operating at rates in excess of 3,000 lines per minute, and typically employ selected indicia producing characters which strike an inked ribbon which is disposed adjacent to the paper to be printed. The inked ribbon may be on the order of 14–18 inches in width, and is typically fabricated from nylon cloth, silk, polyester film or the like. Such ribbons often provide several million lines of printing before the ink contained therein is depleted to the point where the printing indicia is not of a sufficient density.

Different colored ribbons are typically used for different applications. For example, ribbons containing carbon black are often used for applications which require a neat, polished look. Purple ribbons, on the other hand, are cheaper and last longer than carbon black ribbons, but their print quality is not as good. As a result, purple ribbons are most often used for program listings, shipping listings, material listings, and the like. Also used in high-speed line printers for "no carbon required" or NCR-type applications are inkless ribbons.

As is well known, conventional high-speed line printers utilize at least one ribbon edge sensor, most often of the photoelectric variety, in order to provide positioning information for the towel ribbon. One such photoelectric ribbon-edged detector assembly is disclosed in U.S. Pat. No. 4,164,911, issued to Albert N. Nicholson, and assigned to Engineering Systems Corporation. This assembly includes a pair of photoelectric detectors secured to a portion of the upper frame assembly, and slightly offset longitudinally so that their sensing apertures may straddle the plane in which the edge of the towel ribbon is to be disposed. As the edge of the towel ribbon passes between the light sensors and their corresponding light sources, one or the other of the sensors will be blocked or actuated as the ribbon edge wanders while the towel ribbon is being unwound from one spool mechanism and wound onto the other one. Changing signals from the light sensors are employed by the control logic in a conventional manner to control a motor which in turn selectively controls the axial position of the hubs supporting the ribbon spools. In such a manner, the photoelectric edge sensing signals are used to rectify the wrap of towel ribbons which may have been poorly wrapped while being used in a high-speed line printer.

As noted hereinabove, different colored towel ribbons are used for different applications. However, prior art photoelectric ribbon edged detector assemblies such as that described in U.S. Pat. No. 4,164,911 suffer from a common disadvantage in that the accuracy of ribbon edge detection varies in any ribbon not containing carbon black, such as the aforedescribed purple ribbons and inkless ribbons. Because the ribbon edge cannot be accurately and repeatedly detected, highspeed line printers which utilize such prior art ribbon edge detector assemblies may suffer from unprinted characters when the edge of the ribbon uncovers the print hammers. It would, therefore, be desirable to provide an improved optical ribbon edge sensor which would be capable of operating with various colored towel ribbons.

Another disadvantage of the structure of typical prior art ribbon edge detector assemblies resulted from the deep throat provided between the light sensors and their corresponding light sources. One such ribbon edge sensor having a deep throat is manufactured by HEI Inc., Chaska, Minn., as model number HEI 126—1. It can be readily appreciated that any such sensor arrangement having a deep throat complicates loading and unloading of a towel ribbon in that the operator must insure proper seating of the towel ribbon within the throat area of the ribbon edge detector assembly. Accordingly, it would also be desirable to provide an improved ribbon edge detector assembly having a shorter throat, thereby promoting an easier or self-loading feature.

SUMMARY OF THE INVENTION

It is, therefore, a general object of the present invention to provide an improved optical ribbon edge sensor. More specifically, it is an object of the present invention to provide an optical ribbon edge sensor for use in a high-speed line printer which is capable of accurately and repeatedly detecting the edge of a towel ribbon of various colors.

Another object of the present invention is to provide an improved optical ribbon edge sensor which facilitates loading of the towel ribbon therein.

Briefly, these and other objects of the present invention are accomplished by an optical ribbon edge sensor having a relatively short throat, and circuitry which permits adjustability of the sensor in order that it may be sensitive to towel ribbons of various colors. Comparator means including variable resistor means, receive signals from the photosensors in a conventional manner to detect the edge of a towel ribbon in a high-speed line printer. However, by selectively adjusting the variable resistor means of the comparator means, sensitivity of the ribbon edge may be adjusted to accommodate towel ribbons of various colors.

These and other objects, advantages, and novel features of the present invention will become apparent from the following detailed description of the invention when considered in conjunction with the accompanying drawings wherein:

DETAILED DESCRIPTION OF THE INVENTION

Figure 1:
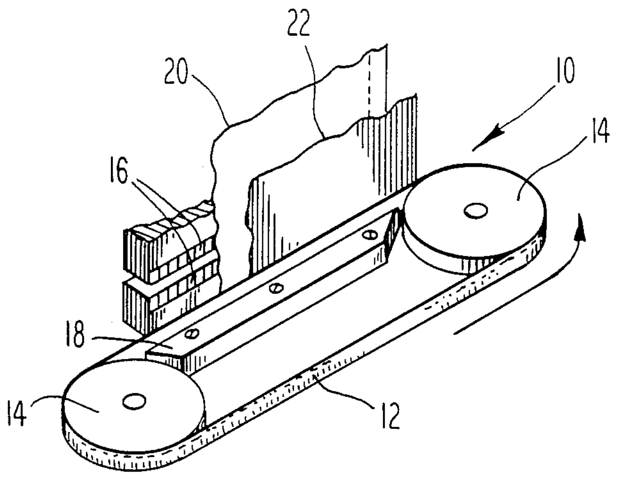
FIG. 1 illustrates in diagrammatic format a portion of a conventional high-speed line printer.

Referring now to the drawings, wherein like characters designate like or corresponding parts throughout the several views, there is shown in FIG. 1 a portion of a conventional highspeed line printer 10, such as the Impact 5000 Series printers manufactured by Documation Incorporated, a subsidiary of Storage Technology Corporation. The printer 10 includes a character band 12 which is rotated in the direction of the arrow as shown about a pair of pulleys 14. As the character band 12 passes in front of a bank of print hammers 16, selective hammers 16 are energized, striking the platen 18, and thereby leaving an impression of the selected character upon forms 20 as inked by the towel ribbon 22.

Figure 2:
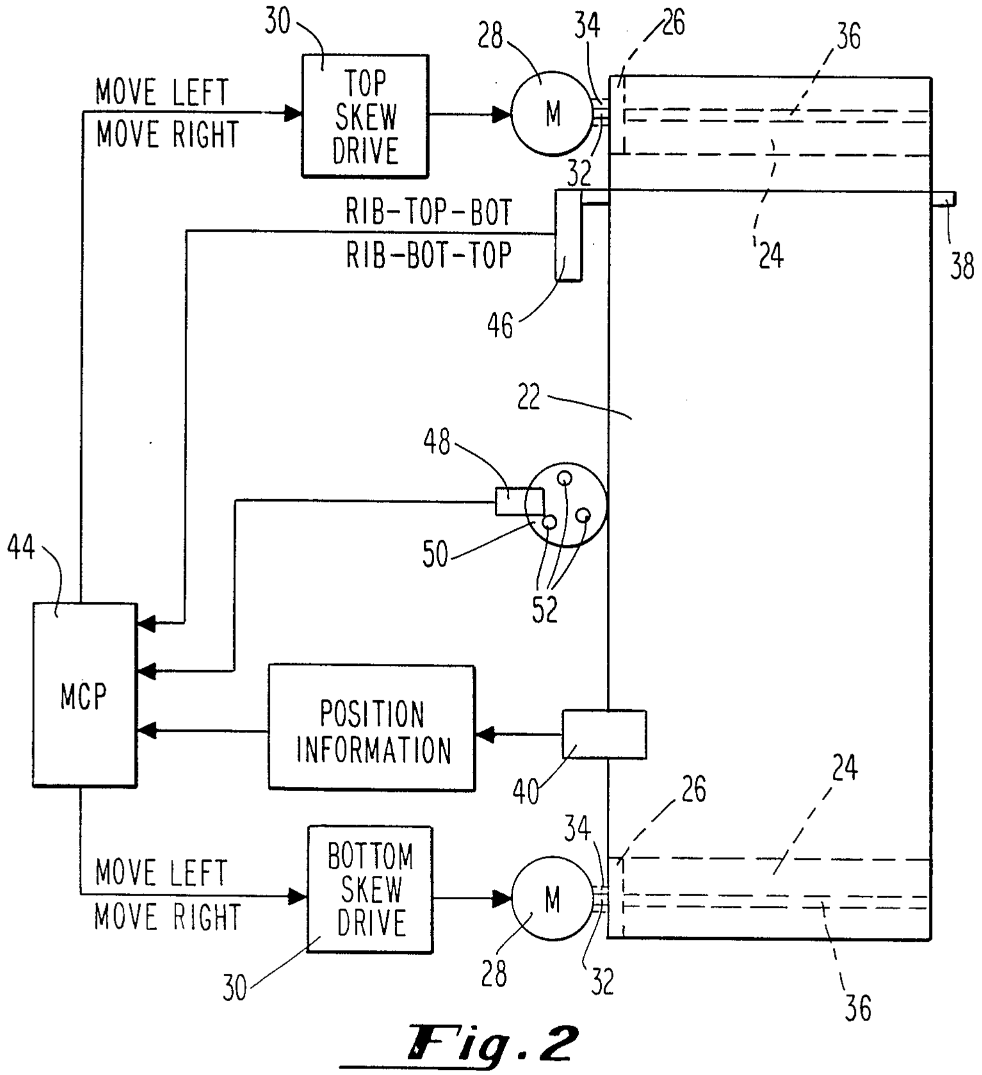
FIG. 2 shows a block diagram of a ribbon skew control for the high-speed line printer illustrated in FIG. 1, and incorporating the improved optical ribbon edge sensor according to the present invention.

The towel ribbon 22, as shown in FIG. 2, is suspended between a pair of ribbon spools 24, each of which are coupled to respective feed hubs 26. A pair of stepper motors 28 are used for skew control, while respective skew drive motors 30 (typically comprised of linear actuators) move the feed hubs 26 and driven spools 24 from side to side as indicated by the arrows. Skew drive shafts 32 move inside hollow ribbon drive shafts 34 and slide the feed hubs 26 on splined ribbon drive shafts 36. The motors 30 linearly position the supply ribbon spool to control ribbon tracking while the take-up spool is in a nominal position.

The inactive skew motor 28 is defined as that motor associated with the ribbon drive side (i.e., take-up spool) as soon as the inactive skew motor 28 becomes inactive, it is stepped to the electrical home or center position and left there as long as it remains in such state. Ribbon reversal via a ribbon reversing bar 38 changes the roles of the skew motors 28 such that the active skew motor 28 becomes inactive, and vice versa. Only the active skew motor 28 is stepped to track the ribbon 22 as detected by a ribbon edge sensor 40.

Three basic sensor types are utilized to sense error conditions and report them to a machine co-processor 44. The machine co-processor 44 thereafter immediately applies corrective action, or displays the appropriate indication on a conventional LCD display (not shown). A ribbon direction sensor 46 senses the direction of the ribbon travel, and is activated by the ribbon reversing bar 42. As one spool becomes full, the ribbon reversing bar 42 activates the ribbon direction sensor 46 which enables the machine co-processor 44 to select active and inactive skew motors 28. Proper ribbon movement is sensed by a ribbon motion sensor 48 located between the two ribbon spools 24. As the ribbon 22 moves between the platen 18 (FIG. 1) and the ribbon shield support (not shown), it rotates a hub 50 containing the ribbon motion sensor magnets 52 which produce three ribbon motion pulses per revolution of the hub 50.

The third type of sensor is the ribbon edge sensor 40 which detects the left edge of the ribbon 22. Sensing is conventionally done by detecting light/dark transitions as the ribbon 22 passes. When the ribbon 22 moves too far to the left or right, it will cause the sensor 40 to signal such movement to the machine co-processor 44. In either case, the machine co-processor 44 will cause the skew motor 28 on the supply spool 24 to correct the error by moving the spool 22 in an appropriate direction.

Figure 3A:
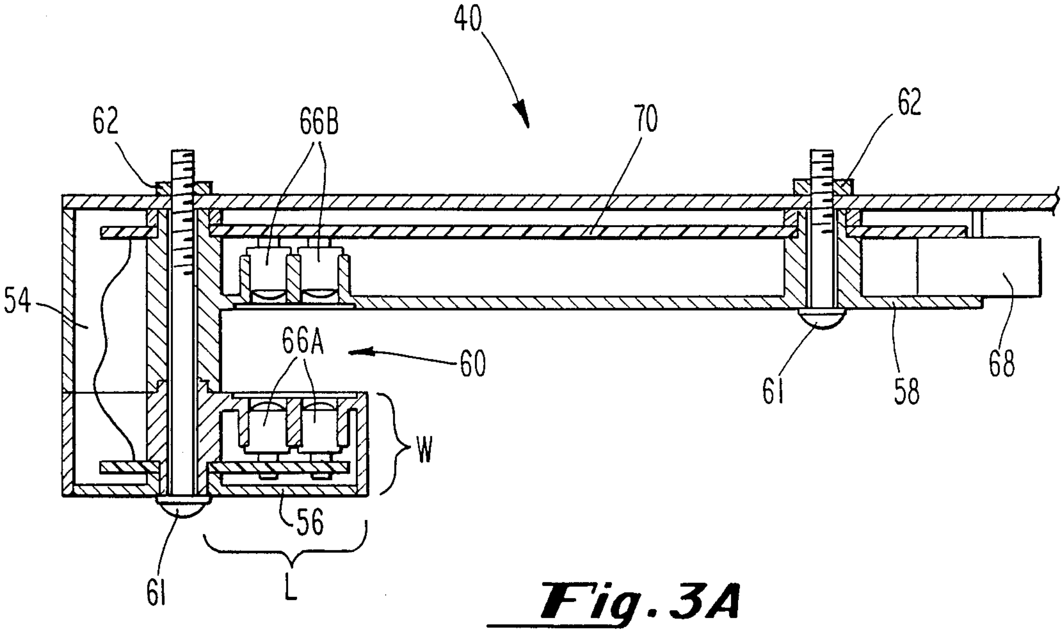
FIGS. 3*a* and 3*b* illustrate in detail the improved optical ribbon edge sensor shown in FIG. 2.
Figure 3B:
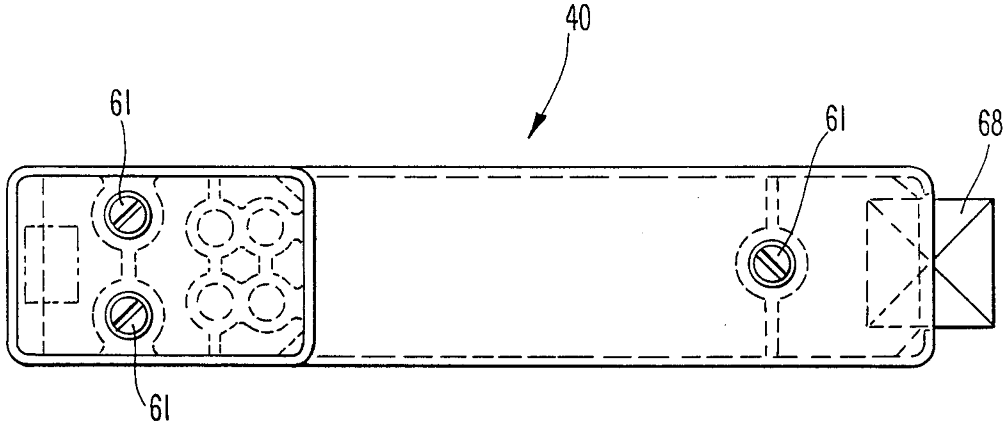

Referring now to FIGS. 3*a* and 3*b*, operation of the ribbon edge sensor 40 will now be described. The sensor 40 is comprised generally of a housing 54 having a short leg 56 and a long leg 58 with a throat area 60 formed therebetween. The long leg 58 is adapted to be affixed by suitable means such as a bolt 60 and nut 62 to the printer frame assembly 64 proximate to one or both sides of the towel ribbon 22. In order to facilitate loading of the towel ribbon 22 in the throat area 60 of the sensor 40, the length L of the short leg 56 should not extend substantially to the right of the right-most sensor pair 66 as shown in FIG. 3A. As the length L of the short leg 56 is extended to the right (as shown in FIG. 3A) past the right-most sensor pair 66, the width W of the short leg 56 must be increased such that the tension in the ribbon 22 causes it to pull into the throat 60, rather than allowing the ribbon 22 to ride on the surface of the short leg 56 remote from the throat 60. As is conventional, one or more pairs of sensing elements 66 are situated on each side of a preferred position for the edge of the towel ribbon 22, with the sensor pairs 66 located to the left (as shown) of the edge of the towel ribbon 22 being normally on while those sensor pairs 66 to the right (as shown) are normally off. In a conventional manner, the sensor pairs 66 may be comprised of a light emitting diode (LED) 66A positioned opposite a phototransitor 66B. Electrical connections for the sensor 54 are conveniently located at a connector element 68 at the end of the long leg 58.

Figure 4:
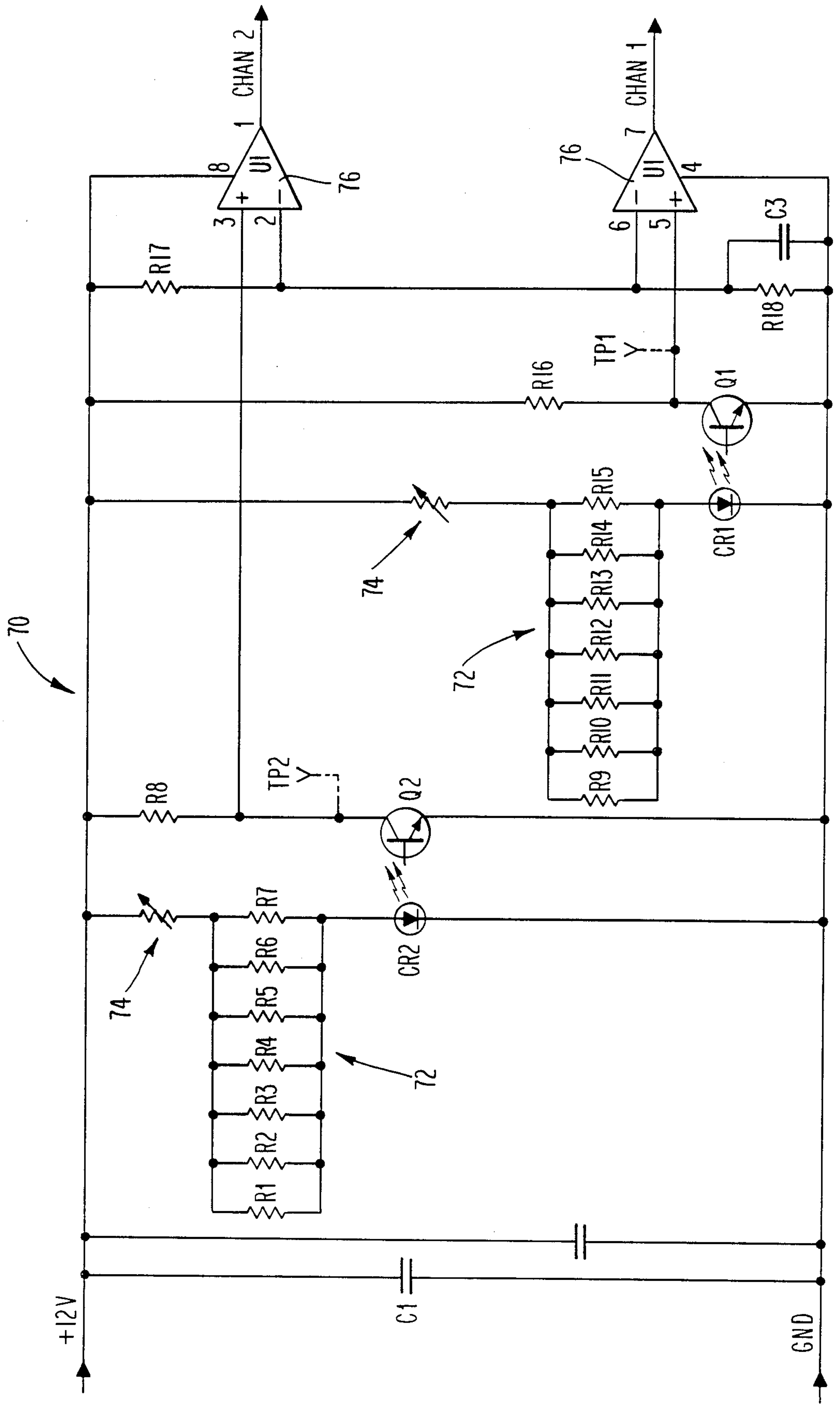
FIG. 4 shows circuitry means, which is coupled to the photoelectric switch means, for adjusting the sensitivity of the switch means to the selected ink color.

In order to provide the sensitivity necessary to accurately and repeatedly detect the edge of towel ribbons 22 of various colors, and referring now to FIG. 4, the sensor 40 according to the present invention includes circuitry mean 70 having a pair of binary sequence resistor networks 72 and corresponding variable resistor means 74. When a particular colored towel ribbon 22 is loaded within the printer 10, the binary sequence resistor networks 72 are used to determine the requisite resistance for detection of the ribbon edge corresponding to a particular colored ribbon 22. Thereafter, the variable resistor means 74 is adjusted to the determined resistance in order to properly bias a dual comparator 76, the output from which is either on or off. Representative values of the circuitry shown in FIG. 4 is indicated below in Table I (units are microfarads for capacitors and ohms for resistors).

TABLE I

| | |
|---|---|
| C1 | .01 |
| C2 | 6.8 |
| R1 | 510 |
| R2 | 1,000 |
| R3 | 2,000 |
| R4 | 3,900 |
| R5 | 8,200 |
| R6 | 16,000 |
| R7 | 33,000 |
| CR2 | LED 55B |
| R8 | 8,200 |
| Q2 | L1462 |
| R9 | 510 |
| R10 | 1,000 |
| R11 | 2,000 |
| R12 | 3,900 |
| R13 | 8,200 |
| R14 | 16,000 |
| R15 | 33,000 |
| CR1 | LED 55B |
| Q1 | L1462 |
| R16 | 8,200 |
| R17 | 27,000 |
| R18 | 24,000 |
| C3 | 0.1 |
| U1 | LM393 |

Further details relating to the operation and control of the Impact 5000 Series printers may be found in the following Documation Incorporated manuals, each of which are incorporated herein by reference: "Theory of Operation"—3800014155; "Product Description Manual"—EP-026-0; "Operator's Manual"—3800014171; Maintenance Manual"—3800014131; "Interface Feature Manual"—3800014159; "Installation Manual'-'—3800014151; "Illustrated Parts Catalog'-'—3800014141; and "Schematics"—3800014161.

Obviously, many modifications and variations of the present invention are possible in light of the above teachings. It is, therefore, to be understood that within the scope of the appended claims, the invention may be practiced otherwise than as specifically described.

What is claimed is:

1. An improved optical ribbon edge sensor for a high-speed line printer having a towel ribbon mounted for substantially linear movement between a pair of parallel, spaced-apart ribbon spools, wherein the towel ribbon comprises a web impregnated with a selected color of ink, the improvement comprising in combination therewith:

means for housing the sensor adjacent the ribbon, said housing means including a pair of spaced-apart leg portions defining therebetween a throat portion adapted to receive an edge of the ribbon;

photoelectric switch means mounted within said housing means; and circuitry means, coupled to said photoelectric switch means, for adjusting the sensitivity of said photoelectric switch means to the selected color of ink.

2. The improved ribbon edge sensor according to claim 1, wherein said leg portions are substantially parallel.

3. The improved optical ribbon edge sensor according to claim 1, wherein one said leg portion comprises a length substantially greater than the length of the other said leg portion.

4. The improved optical ribbon edge sensor according to claim 3, wherein the shorter said leg portion comprises a predetermined length-to-width adapted to retain the ribbon within said throat portion.

5. The improved optical ribbon edge sensor according to claim 1, wherein said photoelectric switch means comprises:

at least one pair of diode means for emitting light across said throat portion; and at least one pair of phototransistor means mounted in opposition to said diode means for reception of said light thereby.

6. The improved optical ribbon edge sensor according to claim 5, wherein one said phototransistor means is normally on and another said phototransistor means is normally off, the edge of the ribbon adapted to bisect said normally on and normally off phototransistor means in a direction of the substantially linear movement.

7. The improved optical ribbon edge sensor according to claim 5, wherein said circuitry means comprises:

comparator means, coupled to said phototransistor means, for outputting a signal indicative of an operational state thereof;

resistor network means for biasing said diode means; and variable resistor means, coupled in series with said resistor network means for matching an equivalent impedance thereof, thereby adapting said diode means for the selected color of ink.

8. The improved optical ribbon edge sensor according to claim 7, wherein said resistor network means comprises a binary sequence of resistors.

9. Apparatus for detecting variations of a selected color web from a predetermined direction of movement, comprising:

a housing including a pair of spaced-apart leg portions defining therebetween a throat portion adapted to receive an edge of the web;

photoelectric switch means mounted within said housing means; and circuitry means, coupled to said photoelectric switch means, for adjusting the sensitivity of said photoelectric switch means to the selected color.

10. The apparatus according to claim 9, wherein the selected color comprises a color containing carbon black.

11. The apparatus according to claim 9, wherein the selected color comprises a color substantially free of carbon black.

12. The apparatus according to claim 11, wherein the web is substantially colorless.

13. The apparatus according to claim 9, wherein said photoelectric switch means comprises:

two pairs of diode means for emitting light across said throat portion in a substantially square array; and two pairs of phototransistor means mounted in opposition to said diode means for reception of said light thereby.

14. The apparatus according to claim 13, wherein one said pair of phototransistor means is normally on and the other said pair of phototransistor means is normally off, the edge of the web adapted to bisect said normally on and normally off phototransistor means in the predetermined direction.

15. The apparatus according to claim 9, wherein circuitry means comprises:

comparator means, coupled to said photoelectric switch means, for outputting a signal indicative of an operational state thereof; and means, including a binary sequence of resistors coupled in series with variable resistor mans, for biasing said photoelectric switch means to respond to the selected color.

16. A method of detecting variations of a selected color web from a predetermined direction of movement, comprising:

providing a housing including a pair of substantially parallel, spaced-apart leg portions defining therebetween a throat portion adapted to receive an edge of the web;

emitting light across said throat portion;

receiving said emitted light with at least one pair of photoelectric switch means, outputting respective signals, one said photoelectric switch means disposed on each said side of the adapted position of the edge;

comparing said output signals to determine the respective operational states of said photoelectric switch means; and providing a means for adjusting the sensitivity of said photoelectric switch means to the selected color.

* * * * *